(12) United States Patent
Angelin et al.

(10) Patent No.: US 12,177,950 B2
(45) Date of Patent: Dec. 24, 2024

(54) METHOD OF DRIVING AN ELECTRICAL LOAD, AND CORRESPONDING SIGNAL GENERATOR AND CIRCUIT

(71) Applicant: Inventronics GmbH, Munich (DE)

(72) Inventors: Francesco Angelin, Mogliano Veneto (IT); Alessio Griffoni, Fossò (IT)

(73) Assignee: Inventronics GmbH, Munich (DE)

( * ) Notice: Subject to any disclaimer, the term of this patent is extended or adjusted under 35 U.S.C. 154(b) by 114 days.

(21) Appl. No.: 17/773,876

(22) PCT Filed: Oct. 30, 2020

(86) PCT No.: PCT/IB2020/060198
§ 371 (c)(1),
(2) Date: May 3, 2022

(87) PCT Pub. No.: WO2021/090132
PCT Pub. Date: May 14, 2021

(65) Prior Publication Data
US 2022/0353969 A1    Nov. 3, 2022

(30) Foreign Application Priority Data
Nov. 5, 2019   (IT) .......................... 102019000020396

(51) Int. Cl.
*H05B 45/325*    (2020.01)
*H05B 45/10*     (2020.01)
*H05B 45/34*     (2020.01)

(52) U.S. Cl.
CPC .......... *H05B 45/325* (2020.01); *H05B 45/10* (2020.01); *H05B 45/34* (2020.01)

(58) Field of Classification Search
CPC ...... H05B 45/325; H05B 45/10; H05B 45/34; H05B 45/33; H05B 45/3725; H02M 3/156
See application file for complete search history.

(56) References Cited

U.S. PATENT DOCUMENTS

2017/0339762 A1*  11/2017  Pan ..................... H05B 45/10
2021/0084725 A1*   3/2021  Lai ..................... H05B 47/165

FOREIGN PATENT DOCUMENTS

CN          206582584 U   *  10/2017

OTHER PUBLICATIONS

Mweene, L H Eet et al., "A 1 kW 500 kHz front-end converter for a distributed power supply system", IEEE, IEEE Transactions on Power Electronics, Jul. 1991, pp. 423-432, vol. 6, Issue 3.
International Search Report issued for the corresponding PCT patent application No. PCT/IB2020/060198, dated Jan. 13, 2021, 13 pages (for informational purposes only).

* cited by examiner

*Primary Examiner* — Daniel D Chang
(74) *Attorney, Agent, or Firm* — Samson G. Yu

(57) ABSTRACT

A method for driving a unidirectional current through an electrical load, such as one or more LED modules, by applying thereto a PWM-modulated signal that swings between a high value and a low value envisages choosing said high value and said low value as nonzero values having a same sign.

10 Claims, 4 Drawing Sheets

FIG. 1
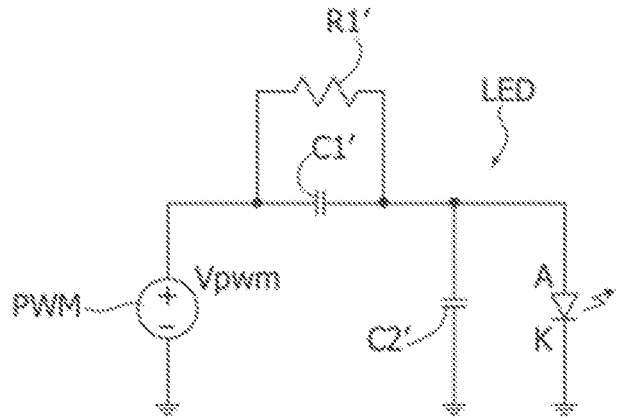
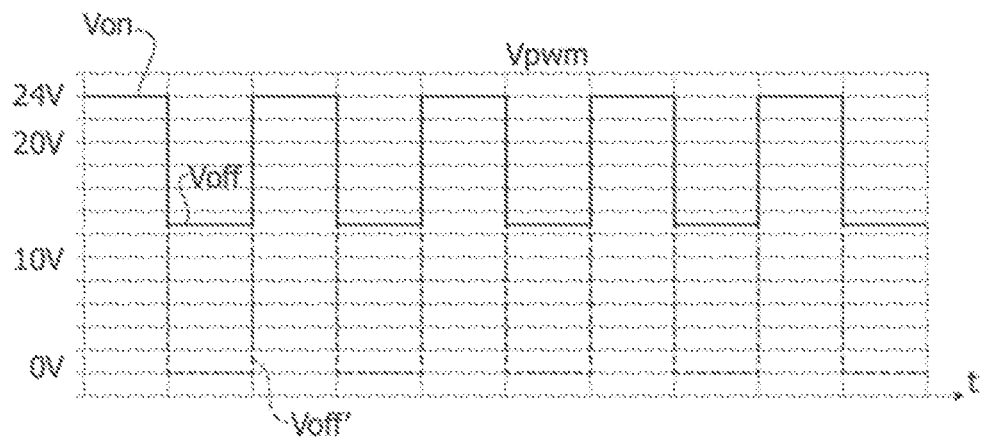
FIG. 2A
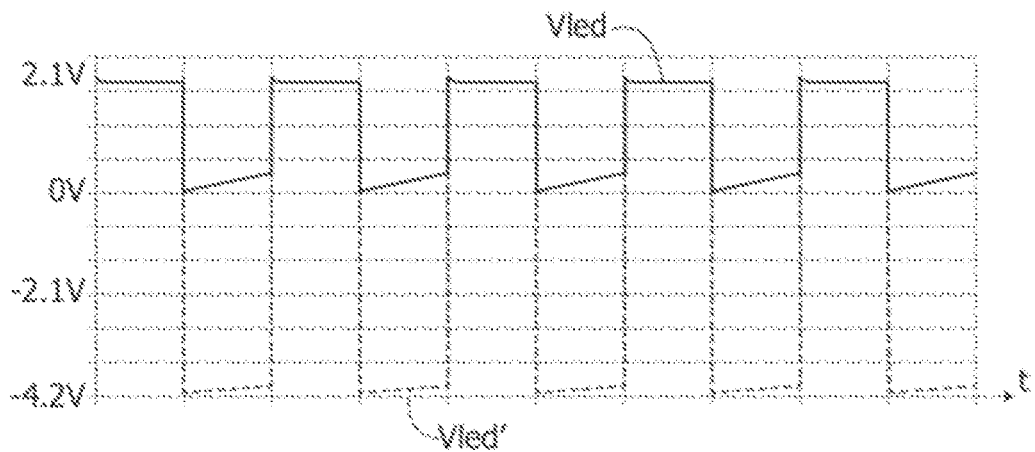
FIG. 2B

METHOD OF DRIVING AN ELECTRICAL LOAD, AND CORRESPONDING SIGNAL GENERATOR AND CIRCUIT

CROSS-REFERENCE TO RELATED APPLICATIONS

The present application is a national stage entry according to 35 U.S.C. § 371 of PCT application No.: PCT/IB2020/060198 filed on Oct. 30, 2020, which claims priority to Italian Patent Application Serial No.: 102019000020396 filed on Nov. 5, 2019; both of which are incorporated herein by reference in their entirety and for all purposes.

TECHNICAL FIELD

The disclosure relates to driving electrical loads.

One or more embodiments may be applied to the power supply of light generators, such as solid-state generators, for example LED generators.

One or more embodiments may find application in constant-voltage (CV) supply systems.

BACKGROUND

A constant-voltage supply system, for example for supply of LED generators, may comprise:
a supply source (for example, an a.c. mains supply or else a d.c. battery) that can be considered as being referenced to earth, an electronic control circuitry, usually referred to as ECG (Electronic Control Gear), which is designed to operate between the supply source and one or more loads (for example, LED modules) so as to apply to the load a desired voltage (for example, 12 V, 24 V, or 48 V) via a connection line (cable).

The ECG can also perform additional functions, such as functions of adjustment of brightness (dimming), correction of the power factor, suppression of radiofrequency interference.

The dimming function may be obtained via a PWM (Pulse-Width Modulation) technique, for example by operating at a pre-set frequency (which may be of 250 Hz, 500 Hz, 1.0 kHz or 2.0 kHz, just to provide some examples, and is possibly variable) intervening on the corresponding active interval, or ON time, so as to obtain a desired value of duty cycle (for example, in a 0.1% to 100% range).

Starting from the output of the ECG, the supply can be transferred to the load via a connection line such as a cable with a length that can range from 0.5 m to 50 m or, possibly, even larger values.

Concentrating on the LED lighting systems (without any intention of limiting the sphere of possible application), the load may comprise a number of electrical units, usually referred to as SEUs (Smallest Electrical Units), which are connected, for example, in parallel to one another, with each unit that in turn comprises a number of LEDs connected together in series with a constant-current regulator, usually referred to as CCR. The regulator (which may be a simple resistor) is designed to set a desired current level, with values that can range, for example, from a few milliamps up to some hundreds of milliamps.

Each LED module, when it is built with a linear configuration, may present a variable length (also as a function of the specific needs of application of use) up to values in the region of 20 m.

The corresponding earthing system may be either explicit, for example, a protection earth (PE), or implicit, as a consequence of the physical arrangement of all the parts of the system, including the fixing elements and all the resistive paths.

When, in systems of the type described above, a dimming action is performed using the PWM technique, it may happen that, for example during OFF time of the duty-cycle, some LEDs in the various electrical units are exposed to transients in reverse-biasing conditions, i.e., with these LEDs subjected to a negative or reverse voltage, with the anode of each LED at a lower potential than the cathode of the same LED.

Analysis of a system of this sort shows that each component element of the system has associated to it a certain capacitance, namely a differential capacitance (between the terminals of the component element) or a capacitance towards ground, with the earth that can act as resistive path hidden between the various elements and components, including the grounds, which may be referred to earth.

The above set of capacitances gives rise to a rather complex network of capacitive dividers capable of transferring the voltage variations of the system (including the ones that may be present on an a.c. supply) towards each individual LED.

Some of these capacitive components are of a parasitic and distributed nature (for example, linked to couplings with the pads or lands of the board, which may be configured as a printed circuit board—PCB). Other capacitive components are desired and concentrated (for example, the capacitors that perform the function of filtering of electromagnetic interference—EMI), while yet others are intrinsic to the structure of the components: consider, as possible example, the junction capacitance of the LEDs.

The corresponding capacitive currents, with their causes and the corresponding effects, consequently derive from the interaction of all the parts of the system, from the nature of such interactions, and hence from the connection configurations, and give rise to a set of possible combinations that is extremely complex.

It is likewise found that, once this capacitive network can be considered fixed in its topology, the amplitude of the reverse voltage may depend upon each value of capacitance and upon the amplitude of the variations that may arise at a.c. sources, such as mainly:
the a.c. mains supply (if present) at the frequency of 50 or 60 Hz; and
the PWM modulator, at its operating frequency.

Such a capacitive network coexists with a resistive network of the system in such a way that the voltages that are set up also depend upon the currents that the individual capacitances are able to drive, which are in turn proportional to the rate of variation of the voltages (in practice, to the derivative dV/dt of the voltage of each source). Consequently, given the same resistive load, the voltages can increase as the frequency increases.

It will be appreciated that the reverse-voltage phenomena referred to are phenomena of a systematic (and virtually predictable) nature as regards their causes and effects, which are linked to normal operation of the system and to the a.c. sources present therein.

The present discussion hence does not refer to phenomena (which are on the other hand rare and in any case unpredictable), such as overloads, discharges or the like, which are also in themselves likely to cause damage to the LEDs, on the basis of mechanisms that, albeit involving capacitive paths, are of an altogether different nature and can be countered by specific measures.

As regards what is of interest herein, it may be noted that the undesired conditions of reverse biasing (reverse voltage) can derive from the superposed effect of two types of capacitive currents.

A first source of capacitive current is the possible coupling with the a.c. mains supply at 50/60 Hz. This is a low-frequency source but with a quite a considerable voltage amplitude. The corresponding path involves the earth to which the supply is referenced, as frequently occurs for the load (LED modules) and the control circuitry, for example the ECG. The series resistance of this current path may be rather high (for example, higher than 1 MΩ) and does not appreciably alter the impedance of the corresponding loop in so far as the capacitances involved have values of a few picofarads, with a similar reactance at a low frequency. Adopting an expression used in the sector of filters for EMI reduction (EMI filters), this can be viewed as a common-mode component.

Another source is represented by the capacitive currents originating by the pulse-width modulation, with frequencies (spectral components) higher than those of the a.c. mains supply and with an amplitude that is quite small (for example, an amplitude of 24 V with a 100% modulation depth of a 24-V system). However, the derivative dV/dt may be significant and thus give rise to a final effect comparable to the one seen previously linked to the mains supply.

In this case, we basically have to do with an effect of a differential type. However, it is also possible to trace a common-mode component in so far as the earth return path is still available through the path passing through the capacitance of the control circuitry as a whole. This value of capacitance comprises not only the capacitor or capacitors effectively present in this circuitry but also, for example, the dispersion capacitance between the primary and the secondary of the circuitry.

It is therefore possible to be faced with the presence of the superposition of the aforesaid two contributions of capacitive current, with these contributions that may either have a certain effect of cancelling one another out or else co-operate synergistically, thus reinforcing one another, leading to reverse voltages on the individual LEDs that may reach values of –10V in a 24V d.c. system.

This phenomenon may prove negative in various contexts of application, with effects that may be noted to a particularly important extent in the case where the load includes low-power LEDs (as the ones normally included in LED strips for lighting applications), which are not prearranged for possibly working in reverse-voltage conditions.

The above LEDs can hence be exposed to repeated phenomena of electrical over-stress (EOS), which may induce a gradual deterioration of performance even to the point where they no longer work (and no longer emit light), a phenomenon that is certainly considered negative.

This problem has been tackled by associating to the load (for example, to each individual LED) a shunt diode (for example, a Zener diode or a Schottky diode) in anti-parallel, so that the reverse voltage will be clamped at approximately –0.6V.

This operating mode represents something of a remedy, but does not offer complete protection against the reverse voltage. Moreover, it amounts to a rather burdensome solution in so far as the cost of the diode in parallel (namely, in anti-parallel) is comparable to the cost of the LED itself: the total cost of the production process (for example, at the level of SMD mounting) is considerably increased considering the fact that the total number of the components (for example, SMDs) is practically doubled.

Another solution that may be envisaged is that of using loads (for example, LEDs) with a diode integrated therein of the type used to counter electrostatic discharge (ESD) phenomena.

Also here, there is a good effect of countering the reverse voltage resulting from the presence also in this case of a diode in parallel (namely, in anti-parallel). It may be noted, however, that the solution of integrating a protection ESD diode in the package of a LED is not extensively practicable, whether because it is far from acceptable in the case of an SMD package of small dimensions, or because, also in this case, albeit overcoming at least in part the problems seen above linked to the process of SMD mounting, there is even so an increase of the costs of the LED components.

Yet a further solution that may be envisage is to set in parallel to each LED resistors of a high value (for example, with values of resistance of between 10 kOhm and 300 kOhm). This solution enables reduction of the impedance between the terminals of the LEDs with an effect of inhibition of the development of the negative voltage so that it is practically possible to prevent onset of the reverse voltage. Also in this case, this is obtained at the expense of an increase in assembly costs similar to that referred to previously with reference to parallel (anti-parallel) mounting of shunt diodes.

SUMMARY

The object of one or more embodiments is to overcome the drawbacks outlined previously.

According to one or more embodiments, the above object can be achieved thanks to a method having the characteristics recalled in the ensuing claims.

One or more embodiments may regard a corresponding signal generator and/or a corresponding circuit, which can be used, for example, together with a lighting system with solid-state light sources (for example, LED sources).

The claims form an integral part of the technical teaching provided herein in relation to the embodiments.

One or more embodiments may enable one or more of the following advantages to be achieved:

- by reducing the swing in amplitude of the PWM signal, it is possible to reduce significantly the negative (reverse) voltage that may develop on a load such as a LED, at least as regards the component of the aforesaid voltage deriving from the current linked to pulse-width modulation (PWM), used, for example, for carrying out dimming of the sources;
- one or more embodiments are suited to being implemented both at the level of signal generator (for example, for driving LEDs) and at the level of the load (LED module, for example), as well as in a specific external component, according to the requirements of application and use, using a smaller number of components that have not particularly critical characteristics, irrespective of the choice of location adopted;
- it is possible to counter effectively a phenomenon that is of increasing importance, given the tendency, which can be encountered in the lighting sector, to resort to LED sources of a cheaper type, which are mintrinsically exposed to the adverse effects of the condition of reverse biasing;
- one or more embodiments prove effective also in the presence of high voltages: for example, a 48 V d.c. system with a modulation depth of 100% may give rise to a reverse voltage that is twice to the one that may arise in a 24 V system; one or more embodiments may envisage, in the presence of a higher voltage, a greater reduction of the modulation depth, for example with a minimum voltage for a 48V ECG that is, for instance, 37 V, equal in absolute terms (11 V) to the one that can be used in the case of a 24 V system.

BRIEF DESCRIPTION OF THE DRAWINGS

One or more embodiments will now be described, purely by way of non-limiting example, with reference to the annexed drawings, wherein:

FIG. 1 and FIGS. 2A-2B exemplify, respectively, a simulation circuit diagram (FIG. 1) and timing charts indicative of possible voltage waveforms (FIG. 2) useful for understanding possible characteristics of embodiments;

DETAILED DESCRIPTION

Figure 3:
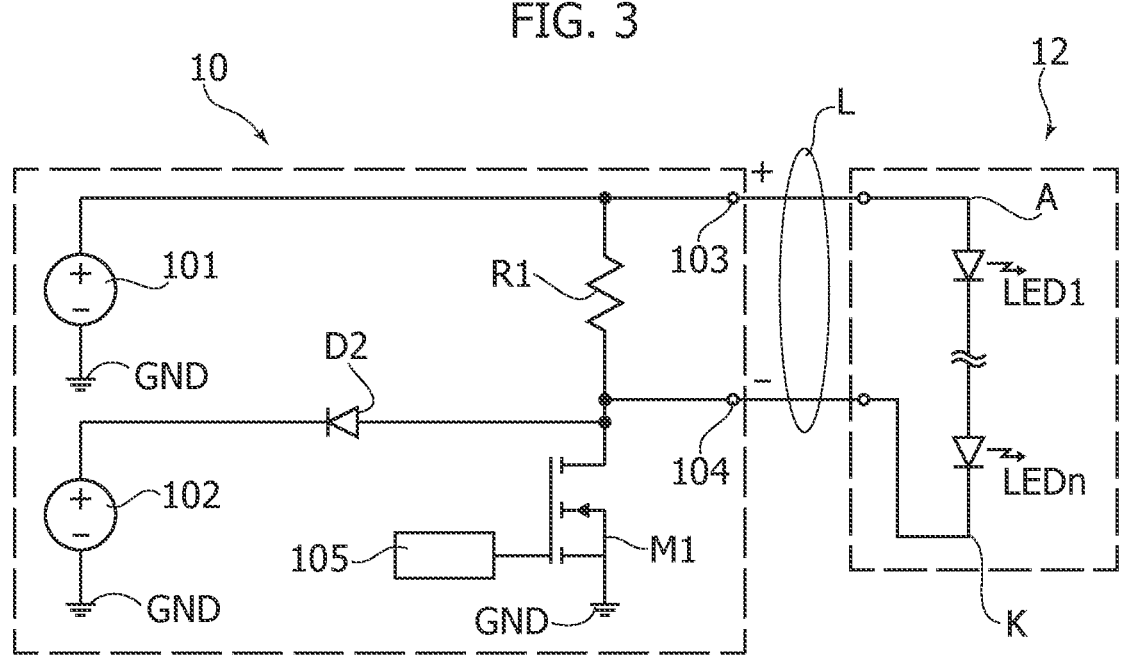
FIGS. 3 to 6 are circuit diagrams exemplifying possible embodiments.

In the ensuing description various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Consequently, phrases such as "in an embodiment" or "in one embodiment" that may be present in various points of the present description do not necessarily refer exactly to one and the same embodiment. Moreover, particular conformations, structures or characteristics may be combined in any adequate way in one or more embodiments.

The references used herein are provided merely for convenience and hence do not define the sphere of protection or the scope of the embodiments.

The solutions described in the introductory part of the present description (which are to be considered to all effects an integral part of the present description of examples of embodiments) basically envisage intervening at the level of the load (for example, at the level of the individual LED) so as to counter the capacitive current injected and its undesired effects.

One or more embodiments as exemplified herein follow, however, a different approach and stem from the observation of the fact that the currents linked to the derivative dV/dt can be traced back to two possible sources, namely, the a.c. mains supply (if present) at a frequency of 50/60 Hz and the pulse-width modulation (PWM), moreover considering that:
the current that can be traced back to the first source (mains supply) can be diverted to earth via one or more specific capacitive paths by closing the common-mode loop on the outside of the load (LED module) with a lower impedance;
it is not in general possible to prevent the differential current deriving from the pulse-width modulation (PWM) from entering the load in so far as it is comprised in the supply current that it is intended to transfer to the load, for example in order to give rise to light emission, in the case of a LED.

In relation to the action of the PWM source, at least two facts may be noted:
the reverse voltage that develops at the terminals of the load (for example, one or more LEDs) is proportional to the voltage jump AV of the PWM signal; and
there exists a minimum (voltage) threshold below which a load such as a LED module switches off anyway, before reaching the value of 0 V.

On the basis of the above considerations, it has been noted that there exists the possibility of avoiding recourse to a pulse-width modulation (PWM) with a maximum (100%) modulation depth by using for the OFF time a level that is not exactly zero and remains (just) below the turn-off threshold of a LED.

For instance, in a 24 V system, such a result may be achieved by choosing for the OFF time of the pulse-width modulation a value (referring in general not to a single LED, but to a plurality of LEDs connected in series to one another) equal, for example, to 13 V.

The above value of 13 V (which is mentioned purely by way of example) is a function of the sum of the turn-off thresholds of the LEDs comprised in the string. For instance, in the case of a SEU used in a 24 V system and comprising, for example, six LEDs cascaded together, the minimum turn-on voltage is approximately 16 V.

Below this level, for example at the level of 3 V, it is reasonable to assume the existence of a sufficient margin to prevent light emission. With reference to this OFF level, the amplitude of the PWM signal (considered as a.c. signal) can be reduced from 24 V to 11 V (peak-to-peak).
Assuming that:
the forward threshold voltage of the individual LED is approximately 2.6 V; and
the reverse voltage developed in a certain position of a LED in the string is −3 V,
with a maximum modulation depth of 100% (24→0) the corresponding voltage drop AV on the LED is 5.6 V.

On the simplified hypothesis of having: i) a linear system; and ii) an infinite resistance on the terminals of the LED below the aforesaid forward threshold voltage (this corresponding to an ideal behaviour of the diode), the simple proportion 24:5.6=11:x means that a voltage drop ΔV of 2.57 V, lower than the forward threshold voltage of the LED (which can be obtained with a reduction of the amplitude of the PWM signal in the terms described above) avoids the eventuality of having a negative voltage possibly being set up on the terminals of the LED.

This consideration can be validated via a SPICE simulation based upon a circuit such as the one exemplified in FIG. 1. FIG. 1 illustrates a PWM-modulation source that generates a PWM-modulated voltage denoted by Vpwm applied to the anode A of a LED, the cathode K of which is referenced to ground through an RC network comprising a resistor R1' in parallel to a capacitor C1', moreover assuming the presence of a capacitance C2' across the LED.

SPICE (Simulation Program with Integrated Circuit Emphasis) identifies a software tool for simulation of analog electronic circuits corresponding to a standard tool of practically universal use.

The timing charts of FIG. 2 correspond to the results achieved with a simulation conducted assuming values of capacitance equal to 100 pF and 150 pF for the capacitances C1' and C2', respectively, and a value of resistance equal to 50 mOhm for the resistor R1'.

The charts of FIG. 2 exemplify the possible correspondence between the voltage generated by the PWM source (denoted by Vpwm in FIG. 2a) and the voltage applied to the LEDs (denoted by Vled in FIG. 2b), respectively when the voltage Vpwm is made to vary between 0 and 24 V (full modulation, at 100%), as represented in the bottom part of the diagrams with a dashed line; and when, instead, the aforesaid modulation amplitude is contained in the range between 13 V and 24 V in the terms exemplified previously, as represented in the portions of the diagrams with a solid line.

From FIG. 2 it may be noted that in the first case (full modulation, at 100%) the voltage Vled across the LED can reach a negative value (denoted by Vled') in the region of −4.2 V, whereas in the case where the modulation amplitude is reduced by bringing the turn-off level to 13 V (which corresponds to a modulation depth of approximately 46%) the voltage Vled across the LED always remains positive.

One or more embodiments make it possible to implement the criterion outlined above (i.e., reduce the modulation depth in order to reduce the reverse voltage) by:

intervening directly on the control circuitry or ECG;
intervening in the load (for example, in a LED module); and
resorting to additional/external circuitry.

Figure 4:
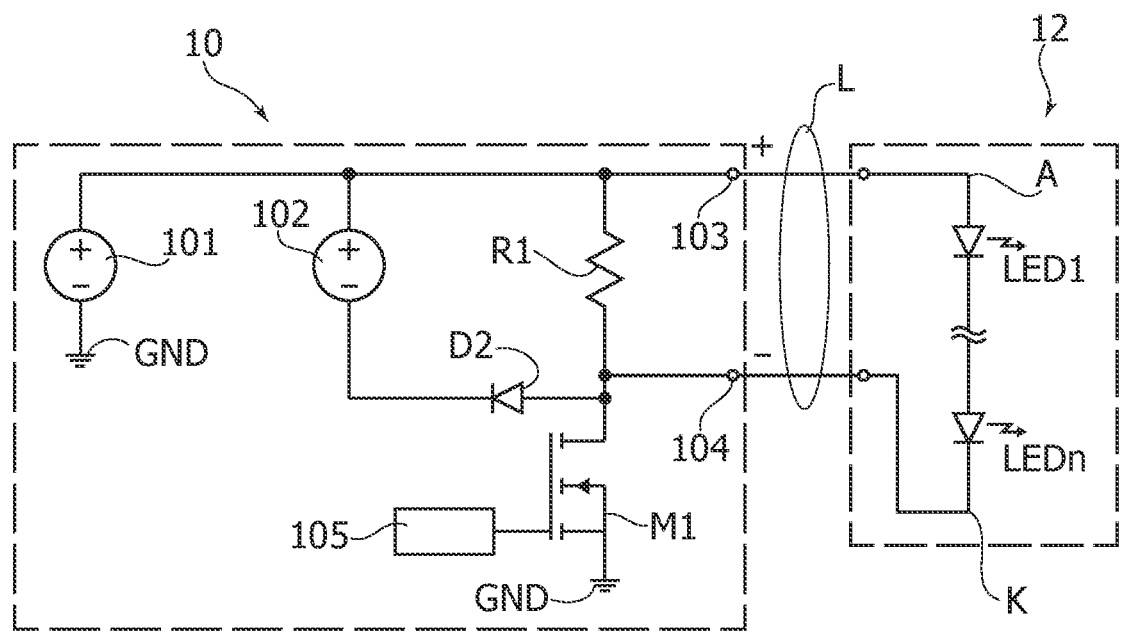

FIGS. 3 and 4 exemplify embodiments where it is envisaged to intervene at the level of control circuitry (ECG) designated as a whole by 10.

Both FIG. 3 and FIG. 4 refer to situations where present in the circuitry 10 are (d.c.) voltage sources 101 and 102 obtained, in a way known to persons skilled in the sector, so as to supply respective voltage values that correspond, respectively, to:

a first voltage value that can be viewed as being equal to the nominal value of the supply voltage envisaged for a load 12, here exemplified in the form of a string of LEDs, i.e., LED1, . . . , LEDn, and equal, for example, to 24 V; and a second voltage value (for example, 11 V in FIG. 3 or 13 V in FIG. 4).

The above values can constitute, respectively, the maximum voltage level and the minimum voltage level that it is intended to use for the PWM signal by causing the PWM signal that is to be transferred to the load 12 to swing between a "high" level (to be used during the ON time of the PWM signal and identified by the value of the voltage of the generator 101) and a "low" level (to be used during the OFF time of the PWM signal and identified by the value of the voltage of the generator 102).

It will be appreciated that, in the present case, the fact of referring to an OFF time is linked to the terminology normally used when talking of a PWM signal that is assumed as having a modulation depth of 100%, hence with a signal that swings between:

a first value, other than zero, for example greater than zero, applied during the ON time, and
a second value, substantially equal to zero, applied during the OFF time.

One or more embodiments envisage, instead intervening on this second value in such a way that also this second value of the PWM signal will be other than zero, for example greater than zero (hence with the same sign as the first value), according to the criteria described previously.

The presence of two voltage generators like the generators 101 and 102 may already be envisaged in a conventional circuitry 10, for example when this is prearranged for enabling driving of a load in constant-voltage (CV) mode with different voltage values.

One or more embodiments as exemplified in FIG. 3 may envisage that the two generators 101 and 102, both referenced to ground GND, are coupled to respective output nodes 103 and 104 (which can be viewed, respectively, as "+" and "−" as regards coupling to the load 12 via a line L), with a resistor R1 the terminals of which are connected to the nodes 103 and 104, while envisaging the presence of a diode D2 set with the anode and the cathode connected, respectively, to the node 104 and to the generator 102 so as to be able to function as ???down-clamp [?CONTROLLARE: pull-down clamping] diode.

One or more embodiments as exemplified in FIG. 3 may envisage the presence of a PWM-modulator circuit 105 (of any known type), which is able to act on a switch M1 to provide the pulse-width modulation (PWM) function with desired values of frequency and duty-cycle.

In one or more embodiments, the switch M1 may comprise an electronic switch, such as a transistor. A field-effect transistor such as a MOSFET of an NMOS type can be used for the purpose with the control terminal (gate, in the case of a field-effect transistor such as a MOSFET) driven by the PWM-modulator circuit 105 and the current path through the transistor (source-to-drain, in the case of a field-effect transistor such as a MOSFET) coupled between the output node 104 and ground GND.

For simplicity of description, the representation provided by way of example in FIG. 3 assumes that the diode D2 behaves like an ideal diode and that the transistor M1 behaves like an ideal switch.

In an embodiment as exemplified in FIG. 3, the generator 102 is used in such a way as to maintain the output voltage across the nodes 103 and 104 at the desired minimum or "low" value (other than zero) when the switch M1 is open (non-conductive), whereas with the switch M1 closed (i.e., conductive) the output node 104 is practically brought to ground, thus setting up between the output nodes 103 and 104 the nominal value (maximum or "high") of the PWM signal supplied by the generator 101.

FIG. 3 exemplifies a solution inspired by the circuit configuration conventionally used in ECG circuitries, namely with a common positive line or rail.

With reference (once again, of course, purely by way of non-limiting example) to the numeric values repeatedly recalled previously, assuming that the voltage of the generator 101 is 24 V, the fact that the voltage supplied by the generator 102 is 11 V means that (assuming, as has been said, an ideal behaviour of the diode D2 and of the switch M1) during the OFF time present between the nodes 103 and 104 is a voltage equal to: 24 V−11 V=13 V.

It may likewise be noted that, in a scheme like the one exemplified in FIG. 3, rather than supplying power, the generator 102 drains power, this effect proving on the other hand negligible, considering the current values involved.

The solution exemplified in FIG. 3 likewise benefits from the fact that the only components additional to a traditional ECG are represented by the diode D2 and (possibly) by the generator 102.

In FIG. 4, parts or elements such as the parts or elements already discussed with reference to FIG. 3 are designated by the same references, which renders repetition of a detailed description of these elements superfluous.

In one or more embodiments as exemplified in FIG. 4, the generator 102 designed to determine the "low" level of the PWM signal during the OFF time, instead of being referenced to ground GND (as in the solution exemplified in FIG. 3), is referenced to the same positive rail as that on which the generator 101 acts.

In the case of FIG. 4 (assuming once again for simplicity of illustration an ideal behaviour of the diode D2 and of the switch M1):

when the switch M1 is driven by the PWM-modulator circuit 105 into the closed condition (switch M1 conductive), the output nodes 103, 104 are coupled, respectively, to the output of the generator 101 and to ground GND, so that the load 12 "sees" across the nodes 103 and 104 the maximum or "high" value of the PWM signal; and when the switch M1 is driven by the PWM-modulator circuit 105 into the open condition (switch M1 non-conductive), between the output nodes 103 and 104 the load 12 "sees" a voltage equal to the voltage of the generator 102, which in this case can be directly chosen at the "low" value desired for the voltage during the OFF time, equal, for example, to 13 V.

Figure 5:
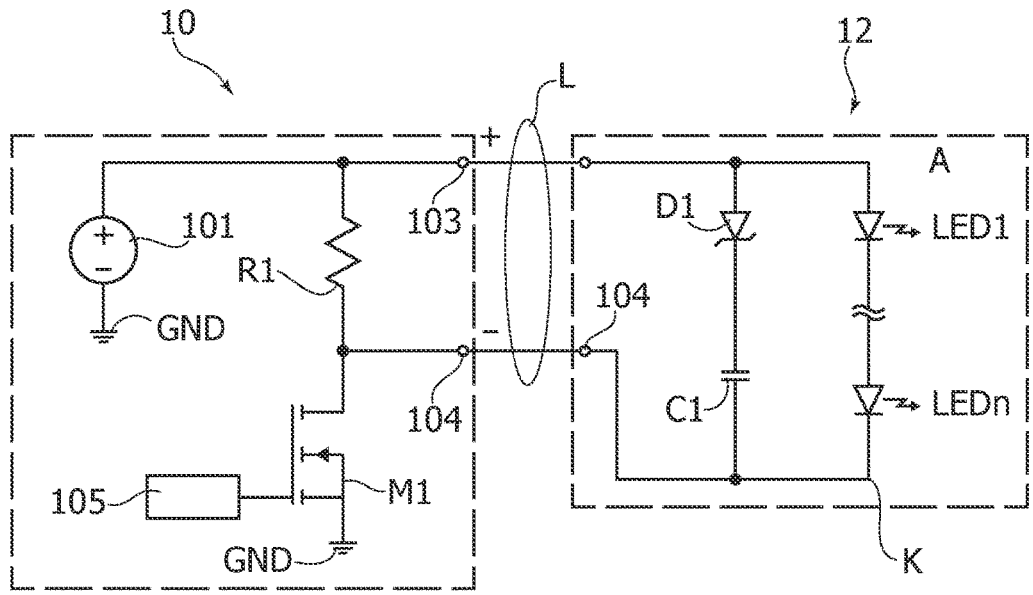
Figure 6:
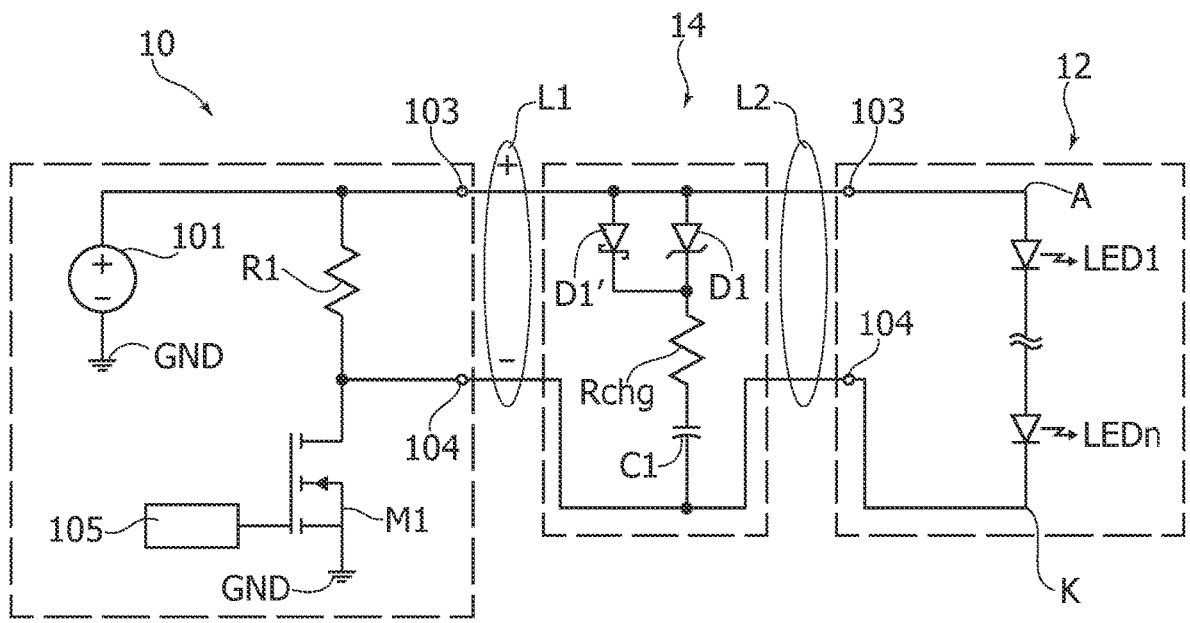

FIGS. 5 and 6 exemplify embodiments where the aforesaid action aiming at having a PWM signal that during the OFF time has a value other than zero is transferred externally with respect to an ECG 10 that is assumed as being of a conventional type.

Such an ECG comprises a d.c.-voltage generator having the nominal value (once again, reference will be made by way of example to a value of 24 V) designated by 101 and acting between ground GND and the output node 103 with a resistor R1 between the output nodes 103 and 104 and a switch M1 acting between the output node 104 and ground under the control of a PWM-modulator circuit 105.

It will be appreciated that FIGS. 5 and 6 use the same reference symbols to indicate parts or elements already discussed with reference to FIGS. 3 and 4: the considerations made previously as regards the possible characteristics and modes of use of the above parts or elements must consequently be deemed applicable also to FIGS. 5 and 6, thus rendering repetition of the corresponding description superfluous.

The solution exemplified in FIG. 5 envisages storing charge (and hence voltage) in a capacitor C1 associated to the load 12 during the ON time (i.e., when the switch M1 is conductive) so that present between the output nodes 103 and 104 is a voltage equal to the voltage of the generator 101.

The above capacitor may, for example, be a capacitor C1 set in series with a diode D1 (such as a Zener diode, for example with a Zener voltage equal to 11 V, i.e., equal to the difference that is to be imposed between the two levels of the PWM signal—see, for immediate reference, the generator 102 in the case of FIG. 3).

In the solution exemplified in FIG. 5, the series connection of the capacitor C1 and of the Zener diode D1 forms a circuit branch that extends between the leads of the line L (hence, from the electrical standpoint, between the nodes 103 and 104), with the branch in turn connected in parallel to the load 12, also here exemplified in the form of a string of LEDs, i.e., LED1, . . . , LEDn.

The capacitor C1 may consequently be used for reducing the modulation depth of the PWM signal, maintaining the level of the OFF time at a value other than zero, with the Zener diode D1 (which once more for simplicity of illustration will be assumed as having an ideal behaviour) designed to be forward-biased during the ON time (namely when the switch M1 is closed, i.e., conductive) so as enable passage of a current designed to charge the capacitor C1, bringing the voltage across the capacitor C1 towards the "high" ON voltage value determined by the generator 101.

During the OFF time, namely when the switch M1 is open (non-conductive), the capacitor C1 operates by reducing the modulation depth with the Zener diode D1 that passes to reverse biasing, causing the load exemplified here by the diodes L1, . . . , Ln "to see" across the line L (i.e., between the nodes 103 and 104) a "low" voltage level, equal to the voltage across the capacitor C1 from which the Zener voltage of the diode D1 is subtracted.

Once again with reference to the values—provided purely by way of example—recalled previously, i.e., assuming that the ON voltage of the generator 101 is equal to 24 V, with a Zener voltage of the diode D1 equal to 11 V, during the OFF time the voltage across the load is equal to: 24 V−11 V=13 V.

A possible advantage of the solution exemplified in FIG. 5 lies in the fact that a circuit branch with the capacitor C1 and the Zener diode D1 does not necessarily have to be replicated for each SEU comprised in one and the same load: for example, one and the same circuit branch comprising a capacitor C1 and a Zener diode D1 may be used for serving a number of SEUs (for example, two or three SEUs of this nature) according to the characteristics of the supporting structure (for example, a PCB) on which the LEDs are present.

This advantage may be mitigated by the fact that at the start the capacitor C1 is discharged, so that it does not immediately carry out a complete action of limitation of the dynamics of the PWM signal and drains a certain additional current in order to be charged, with a cumulative effect in the presence of a large number of circuit branches C1, D1, as may occur in the case of a large number of SEUs.

FIG. 6 exemplifies embodiments that, on the basis of the approach already discussed with reference to FIG. 5, may envisage the use of ECG control circuitry 10 and of a load 12, that are in themselves totally conventional.

The control circuitry 10 represented on the left in FIG. 6 is consequently identical (both as regards the component parts and as regards operation thereof) to the conventional control circuitry already discussed in the description of FIG. 5. Likewise, the load represented by the LEDs, i.e., LED1, . . . , LEDn, represented on the right in FIG. 6 is identical to the load 12, represented on the right in FIGS. 3 and 4.

In one or more embodiments as exemplified in FIG. 6, the function corresponding to the function of the circuit branch C1/D1 of FIG. 5 is transferred to an intermediate component (or "box") 14, which can be interposed in the line L, for example between two branches L1 and L2 thereof.

For simplicity of explanation, in FIG. 6 the output nodes 103 and 104 are represented, so to speak, duplicated both at the output of the circuitry 10 and at the input of the load 12, hence assuming an ideal behaviour of the unit 14 and of the line L1, L2.

Operation of embodiments as exemplified in Figure (which may be advantageously adopted when is it is desired to be able to operate with conventional circuitries 10 and loads 12, without modifications thereof) is conceptually identical to what has already been discussed with reference to FIG. 5, i.e., with the capacitor C1 that charges to the maximum voltage of the PWM signal ("high" value) during the ON time, and with the voltage across the load kept at the "low" value desired for the PWM signal during the OFF time thanks to the effect of subtraction of the voltage imposed by the Zener voltage of the diode D1.

A solution as exemplified in FIG. 6 is advantageously suited to being used together with a number of SEUs, each corresponding to a load such as the one represented on the right in FIG. 6.

This approach may entail the use of a capacitor C1 having a value that is quite high. This may suggest the use of a charge resistor Rchg connected in series to the capacitor C1 in order to contain the forward current through the diode D1 during the charging time.

Altogether similar considerations may suggest arranging in parallel to the Zener diode D1 a diode D1' designed to be forward-biased and facilitate passage of (further) charge current towards the capacitor C1 during the ON time. In this way, it is possible to take into account the fact that the Zener diode D1 can present limitations in the forward-conduction current that is to traverse it during charging of the capacitor C1.

It will, on the other hand, be appreciated that the presence both of the resistor Rchg and of the diode D1' may not be required in certain solutions, for example in systems comprising a smaller number of SEUs.

Figure 7:
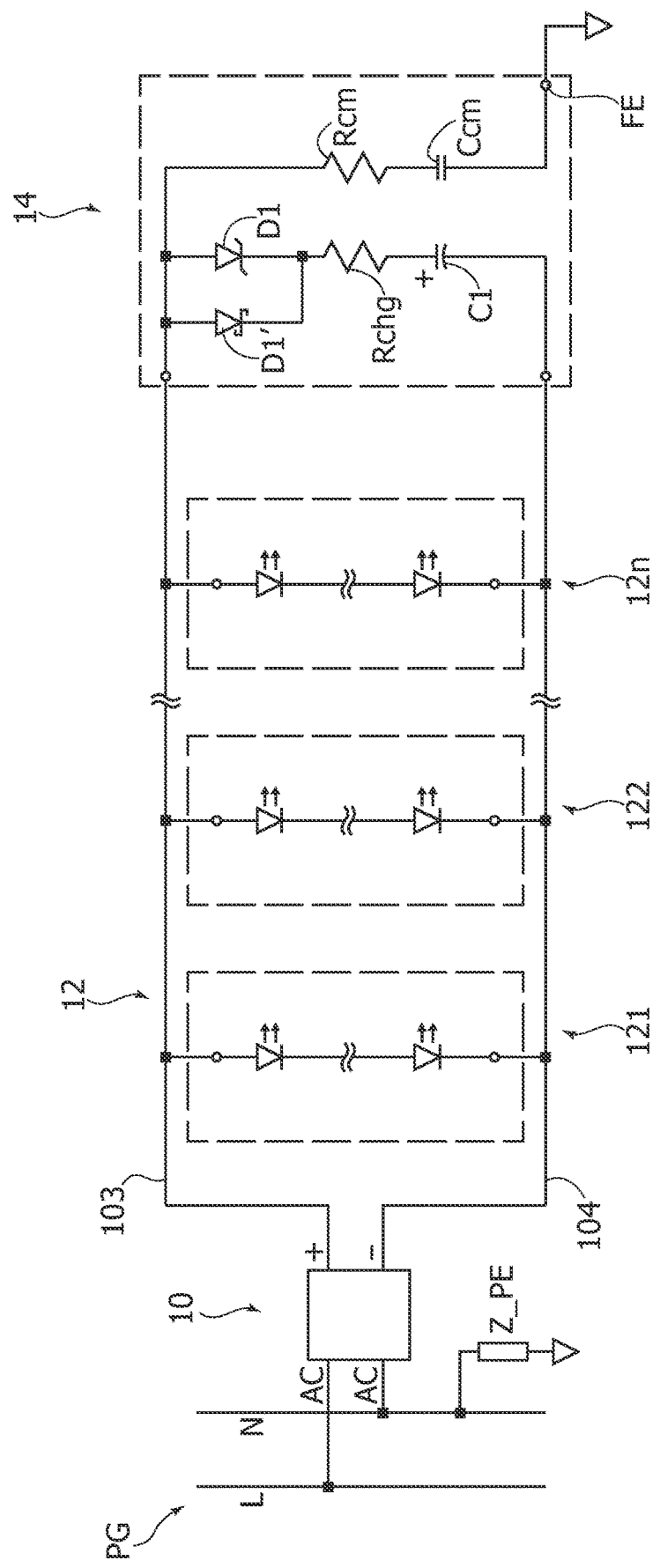
FIG. 7 exemplifies a possible context of application of embodiments within the framework of a lighting system.

FIG. 7 exemplifies the possible use of a solution as exemplified in FIG. 6, i.e., with circuitry 10 of a conventional type, together with a load 12, which is also as a whole conventional and is constituted by the connection in parallel of a number of LED modules 121, 122, . . . , 12n.

FIG. 7 highlights the fact that the location of the additional component 14 between the circuitry 10 and the load 12 (as exemplified in FIG. 6) is not in any way imperative. Once again operating from the electrical standpoint between the output nodes 103 and 104 (and hence in parallel to the load 12), the component 14 may be located also downstream of the load itself, i.e., with the load 12 set between the circuitry 10 and the component 14, as exemplified precisely in FIG. 7.

FIG. 7 likewise exemplifies (on the right-hand side of the figure) the possibility of providing in the component 14 (wherever this is located) a further RC circuit branch, which is coupled to the node/connection 103 and comprises a resistor Rcm and a capacitor Ccm in series.

The above further branch RC may be coupled between the node/connection 103 and earth so as to provide a so-called functional earth FE, which connects the component 14 to ground, facilitating closing towards ground of the common-mode currents and countering the phenomena of reverse biasing (reverse voltage) linked—as extensively discussed in the introductory part of the present description—to the possible presence of capacitive currents linked to the a.c. signal of the mains supply PG.

FIG. 7 also exemplifies (on the left-hand side of the figure) the possible connection of the control circuitry 10 to a supply line PG.

This may, for example, be a mains supply PG at 50/60 Hz with a live terminal L and a neutral terminal N, the latter possibly being referenced to earth via an impedance Z_PE, as in the networks commonly referred to as TT or TN networks.

A method as exemplified herein for driving a unidirectional current through an electrical load (for example, the load 12) applying thereto a signal (for example, a voltage signal, Vpwm) with pulse-width modulation (PWM) (supplied, for example and in a way in itself known by a modulator circuit, such as the modulator circuit 105 capable of generating a rectangular signal with variable duty-cycle), the PWM-modulated signal swinging between a high value (for example, Von) and a low value (for example, Voff), may comprise choosing said high value and said low value as nonzero values having the same sign, for example both positive.

In a method as exemplified herein, said at least one diode with light-emitting capability (LED1, . . . , LEDn) may present a forward (direct) turn-on voltage threshold, and the method may comprise choosing as said low value a voltage value lower than said forward turn-on voltage threshold.

In a method such as the one exemplified herein, the electrical load may comprise at least one string of diodes with light-emitting capability in series, and the method may comprise choosing as said low value a voltage value lower than the sum of the forward-voltage turn-on thresholds of the series-connected diodes.

A signal generator for applying a PWM-modulated voltage signal to an electrical load using the method as exemplified herein may comprise:
  a first node (for example, the node 103) and a second node (for example, the node 104), which are configured to have said load applied between them;
  a first d.c.-voltage generator (for example, 101) set in an intermediate position between said first node (for example, 103) and a ground (for example, GND);
  a second d.c.-voltage generator (for example, 102) set in an intermediate position between said second node and the ground or else between said second node and said first node; and
  a PWM-modulator switch (for example, M1) in an intermediate position between said second node and ground, the PWM-modulator switch being configured (for example, 105) for, alternatively,
  coupling the second node to ground, so that a high value of the PWM-modulated signal is applied between the first node and the second node starting from said first d.c.-voltage generator; and
  decoupling the second node from ground (GND), so that a low value of the PWM-modulated signal is applied between the first node and the second node, wherein the low value of the PWM-modulated signal is a function of:
  the difference between the voltage of the first voltage generator and the voltage of the second voltage generator, when the second voltage generator is set in an intermediate position between said second node and ground; or else
  the voltage of the second voltage generator, when the second voltage generator is set in an intermediate position between said second node and said first node.

A signal generator as exemplified herein may comprise:
  a diode (for example, D2) set in series to the second voltage generator, the diode being configured to counter the flow of current from the second voltage generator towards the second output node; and/or
  a resistor (for example, R1) set in an intermediate position between the first node and the second node.

A circuit as exemplified herein, configured to apply a PWM-modulated voltage signal to an electrical load with the method as exemplified herein may comprise a first node and a second node, which are configured to have said electrical load coupled between them, with the circuit that may comprise:
  the first node and the second node, which are configured to receive applied between them an input signal (for example, a voltage signal) with pulse-width modulation (PWM) (for example, as generated in 101, 105, M1 in FIGS. 5 and 6) that swings between a first value and zero; a series connection of a capacitance (for example, C1) and a Zener diode (for example, D1 in an intermediate position between the first node and the second node, the Zener diode having a Zener voltage and being arranged to counter the flow of current from the second node towards the first node, wherein:

with the first node and the second node that receive, applied between them, said PWM-modulated input signal at said first value, said capacitance is charged towards a high value by current that flows through the Zener diode with the first node brought towards said high value, and with the first node and the second node that receive, applied between them, said PWM-modulated input signal at said zero value, the first node is brought towards said low value as a function of the difference between said high value and the Zener voltage of said Zener diode.

A circuit (14) as exemplified herein may comprise:

a current-limiter resistor (for example, Rchg) coupled to said series connection of a capacitance and a Zener diode, the current-limiter resistor being configured to be traversed by the charge current of the capacitance, and/or a charge diode (for example, D1') coupled in parallel to the Zener diode, the charge diode being configured to provide an additional current path for the charge current of the capacitance.

A circuit as exemplified herein may comprise, coupled to said first node, a (further) series connection of a resistor (for example, Rcm) and a capacitor (for example, Ccm), said series connection being couplable to ground to provide a functional earth path (for example, FE) for the circuit.

A circuit as exemplified herein may be integrated in a single device with said electrical load.

A circuit as exemplified herein, configured to apply a PWM-modulated signal to an electrical load comprising at least one plurality of unidirectional current flow paths (for example, 121, 122, . . . , 12n), may provide a single said series connection of a capacitance and a Zener diode in an intermediate position between the first node and the second node, said single series connection being coupled to the unidirectional current flow paths in said at least one plurality of paths.

Without prejudice to the underlying principles, the details of construction and the embodiments may vary, even significantly, without thereby departing from the sphere of protection, as this is specified by the annexed claims.

LIST OF REFERENCE SIGNS

PWM-modulated signal Vpwm
Voltage on LED Vled
High value Von
Low value Voff
Light-emitting diodes LED1, LEDn
Signal generator 10
First voltage generator 101
Second d.c.-voltage generator 102
First node 103
Second node 104
Load 12
Ground GND
Switch M1
PWM modulator 105
Diode D2
PWM limiter circuit 14
Capacitance C1
Zener diode D1
Current-limiter resistor Rchg
Charge diode D1'
Resistor Rcm
Capacitor Ccm
Functional earth FE
LED modules 121, 122, . . . , 12n
SPICE capacitance C1', C2'
SPICE resistance R1'
Anode A
Cathode
Mains supply PG
Mains earthing impedance Z_PE

The invention claimed is:

1. A signal generator configured to apply a PWM-modulated voltage signal to an electrical load, the PWM-modulated voltage signal swinging between a high value and a low value, wherein both said high value and said low value are non-zero values having a same sign, the signal generator comprising:

a first node and a second node configured to have said electrical load coupled therebetween;

a first dc voltage generator arranged intermediate said first node and a ground;

a second dc voltage generator arranged intermediate said second node and ground or intermediate said second node and said first node;

a PWM modulator switch intermediate said second node and ground, the PWM modulator switch configured to alternately:

couple the second node to ground, wherein the high value of the PWM-modulated voltage signal is applied between the first node and the second node from the first de voltage generator, decouple the second node from ground, wherein the low value of the PWM-modulated voltage signal is applied between the first node and the second node, wherein the low value of the PWM-modulated voltage signal is a function of:

the difference of the voltage from the first de voltage generator and the voltage from the second de voltage generator with said second de voltage generator arranged intermediate said second node and ground, or the voltage from the second de voltage generator with said second de voltage generator arranged intermediate said second node and said first node.

2. The signal generator of claim 1, further comprising:

a diode in series to the second de voltage generator, the diode configured to counter current flow from the second de voltage generator towards the second node; and/or a resistor arranged intermediate the first node and the second node.

3. The signal generator of claim 1, wherein the electrical load comprises at least one diode with light-emitting capability.

4. The signal generator of claim 3, said at least one diode with light-emitting capability has a direct voltage turn-on threshold, wherein a voltage lower than said direct voltage turn-on threshold is selected as said low value.

5. The signal generator of claim 1, wherein the electrical load comprises at least one string of series-connected diodes with light-emitting capability, wherein a voltage lower than the sum of the direct voltage turn-on thresholds of the series-connected diodes is selected as said low value.

6. A circuit configured to apply a PWM-modulated voltage signal to an electrical load by applying thereto the PWM-modulated voltage signal, the PWM-modulated voltage signal swinging between a high value and a low value, wherein both said high value and said low value are non-zero values having a same sign, the circuit comprising a first node and a second node configured to have said electrical load coupled therebetween, wherein the circuit comprises:

the first node and the second node configured to receive applied therebetween the PWM-modulated voltage signal swinging between a first value and a zero value;

a series connection of a capacitor and a Zener diode arranged intermediate the first node and the second node, the Zener diode having a Zener voltage and arranged to counter current flow from the second node towards the first node;

wherein:
 with the first node and the second node receiving applied therebetween said PWM-modulated voltage signal at said first value, said capacitor is charged towards a high value by current flowing through the Zener diode with the first node brought towards said high value; and
 with the first node and the second node receiving applied therebetween said PWM-modulated voltage signal at said zero value, the first node is brought towards said low value as a function of the difference of said high value and the Zener voltage of said Zener diode.

7. The circuit of claim 6, further comprising:
a current limiter resistor coupled to said series connection of the capacitor and the Zener diode, the current limiter resistor configured to be traversed by the charge current of the capacitor; and/or
a charge diode coupled in parallel to the Zener diode, the charge diode configured to provide an additional flow path for the charge current of the capacitor.

8. The circuit of claim 6, further comprising, a series connection of a resistor and a capacitor coupled to said first node, said series connection coupled to ground to provide a functional earth path for the circuit.

9. The circuit of claim 6, wherein the circuit is integrated to a single device with said electrical load.

10. The circuit of claim 6, wherein the circuit is further configured to apply said PWM-modulated voltage signal to the electrical load comprising at least one plurality of unidirectional current flow paths, wherein the circuit comprises a single said series connection of the capacitor and the Zener diode arranged intermediate the first node and the second node, said single series connection coupled to the at least one plurality of unidirectional current flow paths.

* * * * *